United States Patent [19]

Mc Kendry et al.

[11] Patent Number: 5,321,979
[45] Date of Patent: Jun. 21, 1994

[54] ENGINE POSITION DETECTION USING MANIFOLD PRESSURE

[75] Inventors: David G. Mc Kendry, Bloomfield Hills; Kenneth D. Leininger, Sand Creek; Mark G. Thomas, Royal Oak; Matthew T. Hamilton, Warren, all of Mich.

[73] Assignees: General Motors Corporation, Detroit, Mich.; Delco Electronics Corp., Kokomo, Ind.

[21] Appl. No.: 31,517

[22] Filed: Mar. 15, 1993

[51] Int. Cl.$^5$ ............................................. G01M 15/00
[52] U.S. Cl. ...................................... 73/117.3; 73/115
[58] Field of Search ......................... 73/115, 116, 117.3

[56] References Cited

U.S. PATENT DOCUMENTS

| | | | |
|---|---|---|---|
| 3,839,906 | 10/1974 | Hanson | 73/115 |
| 3,864,963 | 2/1975 | Rivere | 73/115 |
| 4,369,660 | 1/1983 | Lentz et al. | 73/115 |
| 4,489,595 | 12/1984 | Klomp et al. | 73/115 |
| 4,672,843 | 6/1987 | Pozniak | 73/115 |
| 4,744,243 | 5/1988 | Tanaka | 73/115 |
| 4,781,059 | 11/1988 | Suzuki et al. | 73/115 |
| 4,892,075 | 1/1990 | Iriyama et al. | 73/115 |
| 4,903,657 | 2/1990 | Miyazaki et al. | 73/115 |
| 5,031,450 | 7/1991 | Nakaniwa et al. | 73/115 |
| 5,065,729 | 11/1991 | Kravter et al. | 73/115 |

*Primary Examiner*—Hezron E. Williams
*Assistant Examiner*—George Dombroske
*Attorney, Agent, or Firm*—Howard N. Conkey

[57] ABSTRACT

The absolute angular position of an internal combustion engine is determined by monitoring engine intake manifold pressure at a strategic position in the manifold affected most significantly by the intake event of a predetermined cylinder. A significant or maximum depression in manifold pressure over each engine cycle then is indicative of the intake stroke of the predetermined cylinder.

9 Claims, 4 Drawing Sheets

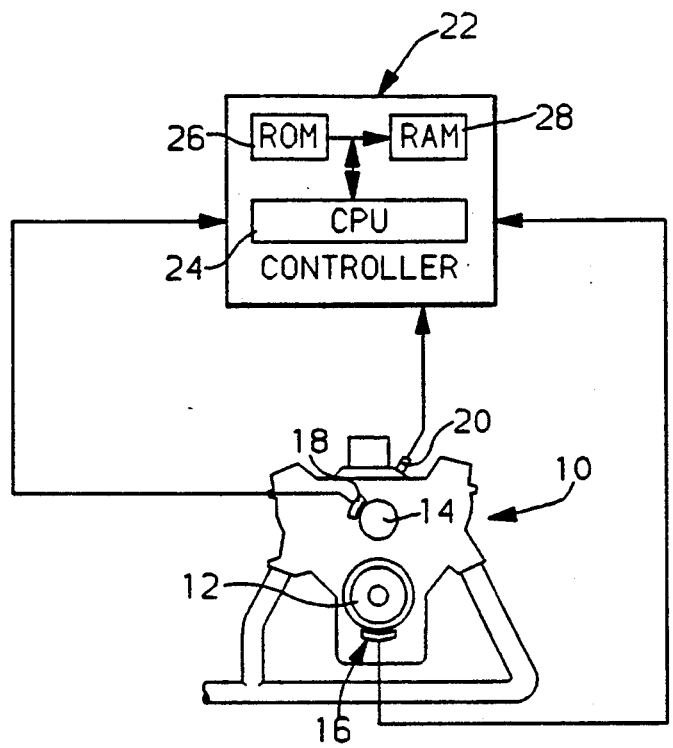
FIG. 1
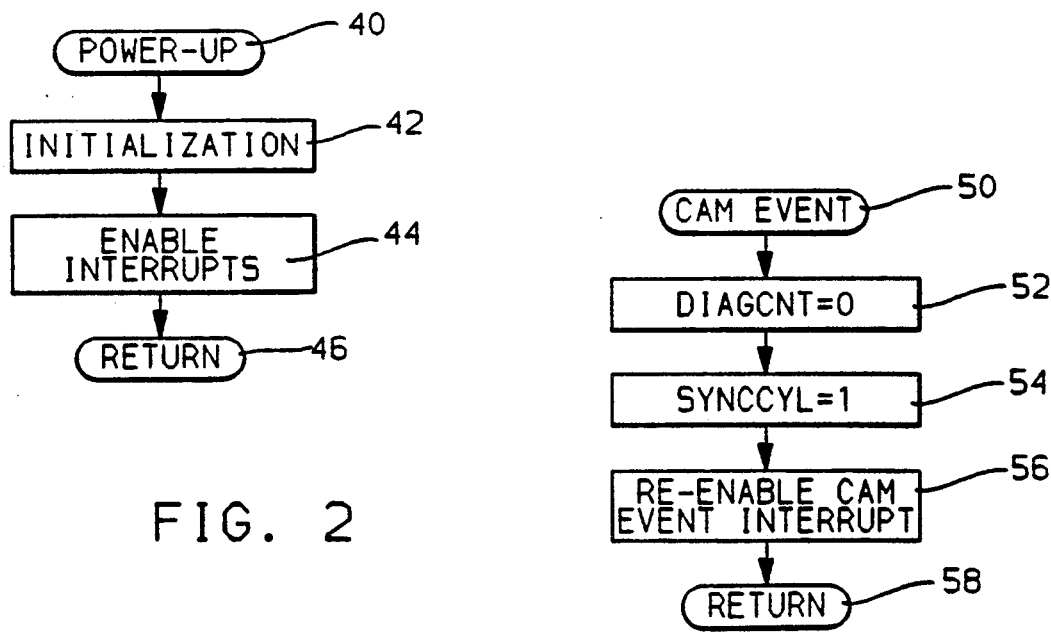
FIG. 2
FIG. 3

ENGINE POSITION DETECTION USING MANIFOLD PRESSURE

FIELD OF THE INVENTION

This invention relates to internal combustion engines and more particularly to a method and apparatus for determining engine angular position using engine intake manifold pressure.

BACKGROUND OF THE INVENTION

Engine angular position is relied on as a control input in conventional approaches to engine control, for instance in fuel control. Camshaft position sensing hardware is thus provided in conventional mechanizations by which a camshaft reference signal is provided the control, typically once per engine cycle, to synchronize a crankshaft signal with the activity of the individual cylinders of the engine. The engine controller thus is provided sufficient information with which to, among other things, make appropriate decisions on fuel timing.

The additional hardware mandated by the above described conventional approach is typically used as described—for crankshaft reference signal synchronization. As such, the cost of the additional hardware is justified only by the need for the camshaft reference signal. Additionally, gains in control precision provided by the camshaft reference signal may be surrendered in the event the signal becomes faulty, for instance by operating the engine in a fallback mode wherein the level of engine performance must be sacrificed. Conventional systems may mitigate against the risk of a fault in the camshaft reference signal generating means only by adding to the cost of the system.

Accordingly, what is needed is an inexpensive method and apparatus for reliably sensing engine angular position. Further, what is needed is an inexpensive method and apparatus for providing information on engine angular position in the event the camshaft reference signal as generated by conventional means is diagnosed as faulty.

SUMMARY OF THE INVENTION

The present invention overcomes the shortcomings of the prior art systems by providing a reliable means of sensing engine angular position using sensors already available on many conventional vehicles. No camshaft position sensing hardware is required to generate the reliable signal of the present invention. Specifically, the engine intake manifold absolute pressure MAP sensor, already available in many conventional engine mechanizations, may be strategically located in the intake manifold so as to be influenced by the intake event of a predetermined cylinder of the engine in such a manner that the event may be distinguished from other like events from the other cylinders of the engine. For instance, if the sensor is significantly closer to the intake runner of one cylinder of the engine, the loss in pressure in the intake manifold caused by the intake stroke of that cylinder will bear more heavily on the sensor reading than will the intake events of the other cylinders. By monitoring the MAP signal of a sensor so located, the engine controller may ascertain the time of the intake event for that cylinder, and thereby determine engine angular position.

Alternatively, the engine angular position sensor of the present invention may be used as a failsafe in the event the camshaft position sensor is diagnosed as faulty, by disregarding the camshaft sensor signal and by relying on the monitored MAP sensor in strategic location.

BRIEF DESCRIPTION OF THE DRAWINGS

FIG. 1 is a diagram of the hardware used in a preferred embodiment of this invention;

FIGS. 2–5 are computer flow diagrams illustrating the steps used to carry out this invention in accord with a preferred embodiment.

DESCRIPTION OF THE PREFERRED EMBODIMENT

Figure 4:
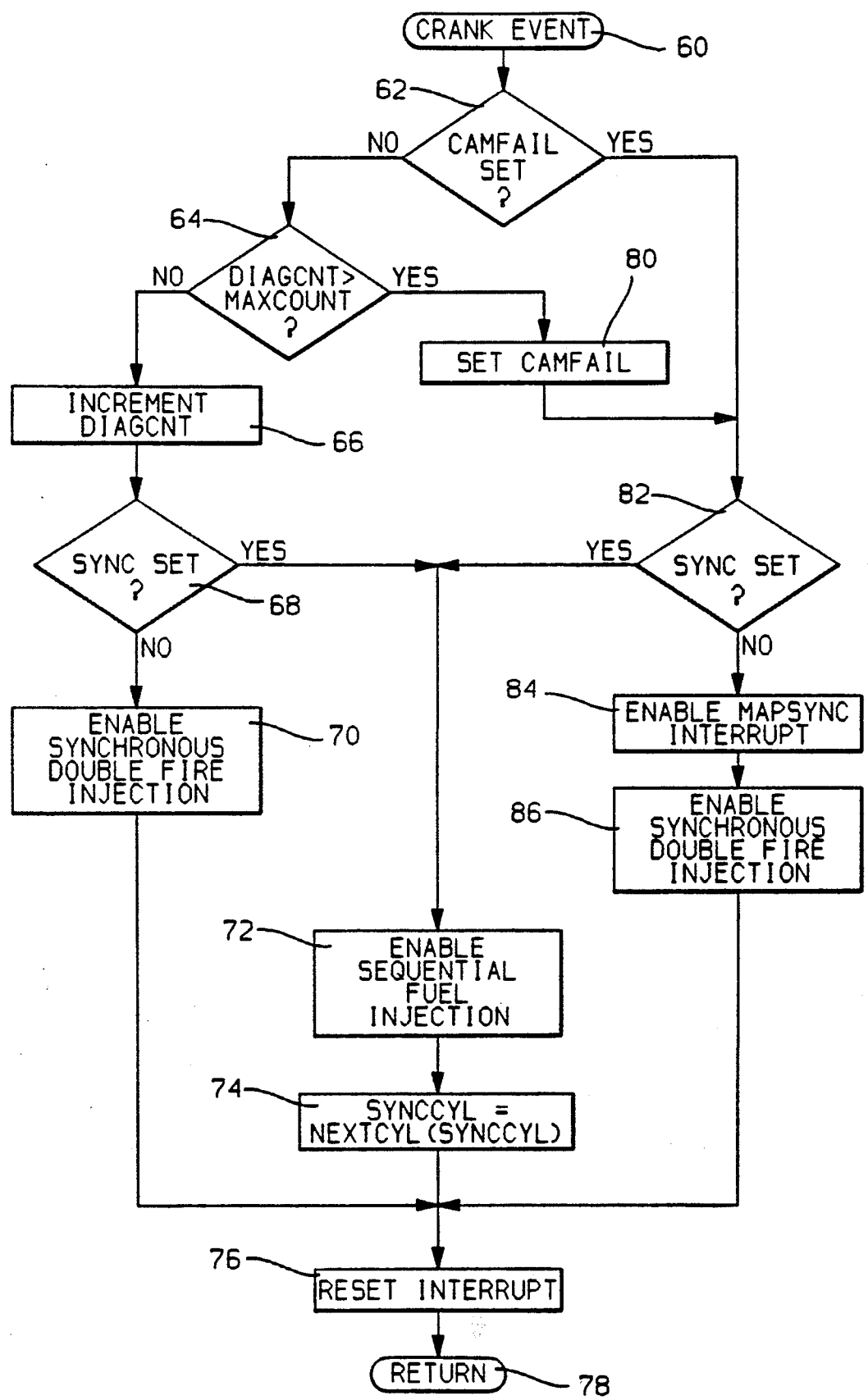

Referring to FIG. 1, an internal combustion engine 10 having a plurality of cylinders and having a crankshaft 12 communicates the passage of a plurality of teeth disposed about the circumference of the crankshaft 12 by a conventional variable reluctance sensor 16. The sensor 16 is in position to have a magnetic field generated by the sensor disrupted in a predictable manner by the passage of the teeth. A substantially sinusoidal voltage thus is induced across the sensor with a frequency proportional to the rate of passage of teeth by the sensor 16, which is proportional to the rate of rotation of the crankshaft 12. In this embodiment, two teeth are disposed on the crankshaft in position to pass the sensor 16, such that with the four cycle, four cylinder engine of this embodiment, four teeth pass the sensor 16 for each engine cycle, or one per cylinder power stroke. The sensor 16 output is communicated to an engine controller 22 wherein a crankshaft event interrupt, to be described, is generated once for each period of the sinusoidal signal in a manner generally understood in the art of engine control.

A camshaft 14 is provided for engine valve control with a rate of rotation proportional to the rate of rotation of the crankshaft 12. In this embodiment including a four cylinder, four-stroke engine, the camshaft completes one revolution per engine cycle, or rotates at half the angular rate of the engine crankshaft. A single tooth (not shown) is disposed on the circumference of the camshaft 14 which, in the manner described for the crankshaft 12, passes in proximity to a variable reluctance sensor 18 located so as to provide a substantially sinusoidal waveform to the controller, the frequency of which is proportional to the angular rate of the camshaft 14. The controller 22 generates a cam event interrupt, to be describe, in a manner well understood in the art of engine control once for each period of the sinusoidal signal.

In this embodiment, the tooth on the camshaft is located in a manner coordinated with the location of the teeth on the crankshaft, whereby the camshaft tooth indicates the start of an engine cycle. For instance, the firing order of the four cylinder engine of this embodiment is 1-3-4-2. By positioning the CAM tooth to pass the sensor 18 after the occurrence of the crank event corresponding to the power stroke of cylinder 2, and before that of cylinder 1, the beginning of an engine cycle is indicated.

A manifold absolute pressure MAP sensor 20 is strategically positioned in the engine intake manifold a short distance from the air intake for a single engine cylinder, and a greater distance from all other air intakes. The manifold pressure transduced by the sensor 20 is thus more significantly affected by manifold pressure depression from the intake event of the single cylinder, cylinder four in this embodiment, than from that of the other cylinders. The sensed MAP is communicated to the engine controller 22. The controller may be a eight bit, single-chip microcomputer, such as a Motorola MC68HC11, having read only memory ROM 26, random access memory RAM 28, and a central processing unit CPU 24. The CPU 24 executes a series of programs to read, condition, and store inputs from vehicle sensors and, with the information provided by the inputs, manage operation of the vehicle.

Among the programs used for vehicle management are those illustrated in FIGS. 2-5. These routines generally sense crankshaft events and "synchronize" them, meaning that the routines identify a crankshaft event as being indicative of a position in the overall engine cycle. With this information, subsequent crankshaft events may be used to repetitively count through the engine firing sequence wherein once synchronized, the crank events will remain synchronized while the engine is running.

In this embodiment, synchronization is provided by a conventional camshaft position sensor 18. In the event the camshaft position sensor is diagnosed as faulty, synchronization is provided by monitoring the MAP sensor output signal. In a critical part of this invention, a sufficiently low MAP signal indicates the occurrence of the intake stroke of the cylinder whose intake runner (intake air path) is closest to the MAP sensor 20. As discussed, the MAP sensor 20 is strategically placed in close proximity to just one intake runner so that the pressure it measures may be more substantially affected by the intake event of the "close" cylinder. In an alternative embodiment, the cam position sensor 18 may be replaced altogether by the MAP sensor in position to synchronize the crankshaft events. In still another embodiment, both the cam position sensor 18 and the MAP based synchronization may be operating contemporaneously for cross-verification. If the two do not agree on the position of the engine in the engine cycle, a fault may be conventionally indicated, and a less sophisticated fueling algorithm may be enabled, such as the synchronous double fire algorithm, to be described.

Returning to the preferred embodiment, when power is applied to controller 22, such as when the vehicle operator rotates the key to its "on" position, the routine illustrated in FIG. 2 is entered at step 40. The routine moves to step 42 for general initialization, wherein counters and pointers are set to initial values and data constants are transferred from ROM 26 location to RAM 28 locations. Additionally at step 42, RAM variables used in the specific routines of this embodiment are initialized. Specifically, SYNCOUNT is set to zero, SYNC is set to zero, and FRFLAG is set to one. The role of these variables will be described.

Next, the routine moves to step 44 to enable interrupts used by the controller 22, such as those known generally in the art to be needed for conventional engine control. Such interrupts may be time based or event driven. Specific to this embodiment, two event driven interrupts are enabled at this step. The first of these is a cam event interrupt, which is generally known in the art as occurring when the cam sensor 18 detects passage of the cam tooth, which is once for each period of the substantially sinusoidal cam position sensor signal, as described. When this interrupt occurs, an appropriate interrupt vector stored in ROM 26 directs the CPU 24 to execute the routine of FIG. 3, to be described. The second interrupt is a crank event interrupt, which is enabled to occur in conventional manner when the crank sensor 16 detects passage of a crank tooth, once for each period of the crank position sensor signal, as described. When a crank event interrupt occurs, an interrupt vector in ROM 26 directs the CPU 24 to execute the routine of FIG. 4, to be described.

Next, the routine of FIG. 2 moves to step 46 to return to any routines it may execute, such as any conventional diagnostic routines or processor housekeeping routines, while waiting for one of the enabled interrupts to occur.

The routine executed upon a cam event interrupt is illustrated in FIG. 3, and is entered at step 50. The routine moves to step 52 to set DIAGCNT to zero. DIAGCNT is a count of the number of crank events between cam events, and is used to determine if the cam events are occurring regularly. If DIAGCNT exceeds a predetermined value, to be described, it is assumed the cam position sensing circuitry is faulty and, in accord with this embodiment, MAP sensor based synchronization intervenes, as will be described. Next, the routine moves to step 54, to set SYNCCYL to one, synchronizing the crankshaft sensor. By setting SYNCCYL to one, an indication is made that, due to the aforementioned positional relationship between the tooth on the camshaft and those on the crankshaft, the next crank event will correspond to cylinder one. The routine next moves to step 56, where it re-enable the cam event interrupt to occur on the next detected cam tooth passage by the sensor 18. The routine then proceeds to step 58, to return to any routine it may have been executing at the time of the cam event interrupt, such as the described general diagnostic or housekeeping routines.

Figure 6A:
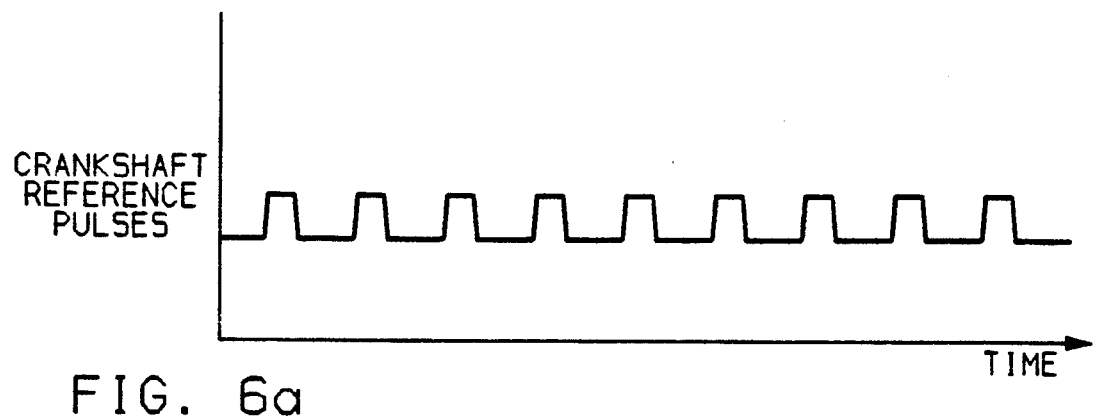
FIGS. 6a–6c are general timing diagrams showing the time relationship of signals used in accord with this invention.

The routine that is executed each crank event interrupt is illustrated in FIG. 4, and is entered at step 60. A crank event interrupt is generated upon each crank event, such as the series of events (pulses) illustrated generally in FIG. 6a. When entered at step 60, the routine advances to step 62, to determine if CAMFAIL is set. CAMFAIL is a flag in RAM 28 that indicates a prior detected cam position sensor fault.

If CAMFAIL is set, indicating a prior diagnosed cam fault, the routine moves to step 82, to determine if flag SYNC is set, which indicates that the crankshaft sensor has already been synchronized, such as before the cam fault was detected. If SYNC is set, further synchronization such as that afforded by the MAP sensor based routine of this invention is assumed to be unnecessary, and the routine moves to step 72, to enable conventional sequential fuel injection SFI for the engine. It is generally known in the art of engine control that SFI provides precise fueling to each cylinder of the engine at the time the fuel is needed for that cylinder, such as during the cylinder intake event. However, such control requires a synchronized crank position sensor to distinguish between the cylinders. Accordingly, SFI is only enabled when the crank position sensor is synchronized.

However, if SYNC is not set at step 82, synchronization is necessary. Accordingly, the routine proceeds to step 84, to enable an interrupt, the service routine of which reads and interprets the MAP sensor signal for synchronization, as will be described in FIG. 5. The routine then moves to step 86, to enable synchronous double fire SDF fuel injection, a well known means of adequately fueling an internal combustion engine without reliance on a synchronized crank sensor. For example, SDF fueling may send a fuel pulse to all cylinders contemporaneously once per crankshaft revolution. Next, the routine moves to step 76 to reset the crank event interrupt, and then returns to any previously executing routine via step 78.

Alternatively at step 62, if CAMFAIL is not set, the routine moves to step 64 to determine if CAMFAIL should be set, by comparing DIAGCNT to a calibrated value stored in ROM 26 called MAXCOUNT. DIAGCNT is a RAM 28 stored count of the number of crank events since the last cam event. In the four cycle, four cylinder engine of this embodiment, there are two teeth on the crankshaft which rotates 720 degrees per engine cycle, and one tooth on the camshaft which rotates 360 degrees per engine cycle. Accordingly, if the crankshaft position sensor 16 (FIG. 1) and the camshaft position sensor 18 (FIG. 1) are properly sensing tooth passage, four crank event should be detected for every one cam event. Therefore, MAXCOUNT is set to four, and DIAGCNT is cleared at startup and on each cam event at step 52 (FIG. 3), and is incremented on each crank event at step 66.

Returning to FIG. 4, if DIAGCNT exceeds MAXCOUNT at step 64, it is assumed the camshaft position sensor is faulty and CAMFAIL is set at step 80. The routine then moves to step 82, to determine if further synchronization is necessary, as described. If so, MAP synchronization will be provided at step 84 and, until appropriate synchronization is complete, the routine will continue to enable synchronous double fire injection at step 86, as described.

Returning to step 64, if DIAGCNT does not exceed MAXCOUNT, the routine moves to step 66 to record the crank event by incrementing DIAGCNT. The routine then moves to step 68, to determine if the crankshaft is yet synchronized. If so, the flag SYNC will have been set, and the more precise sequential fuel injection SFI may be enabled at step 72, as described. Of course, to predict the next active cylinder, it is not enough to sense crank events. Rather, the crank events must be synchronized, so that a single crank event may be mapped into the overall engine cycle, as described.

After enabling conventional SFI at step 72 for the next active cylinder, the routine moves to step 74, to point to SYNCCYL, the next cylinder which will be active according to the assignment function NEXTCYL(). NEXTCYL() is simply a map from the present cylinder to the next active cylinder according to the engine firing order. For instance, the firing order of the engine of the present embodiment is 1-3-4-2. Accordingly, in the present embodiment, the four entry vector NEXTCYL() is as follows
  NEXTCYL(1)=3
  NEXTCYL(2)=1
  NEXTCYL(3)=4
  NEXTCYL(4)=2.
With this arrangement, the next cylinder to be active is derived according to the equation SYNCCYL=NEXTCYL(SYNCCYL) at step 74. After step 74 is executed, the routine proceeds to step 76, to reset the crank event interrupt in a conventional manner so the routine of FIG. 4 will be executed on the next crank event. The routine then advances to step 78 to return to any routine executing prior to the present crank event interrupt.

Returning to step 68, if the engine is not yet synchronized, the routine moves to step 70, to enable the described synchronous double fire injection. The routine then resets the crank event interrupt at step 76, and returns to a prior routine via step 78, as described.

Figure 5:
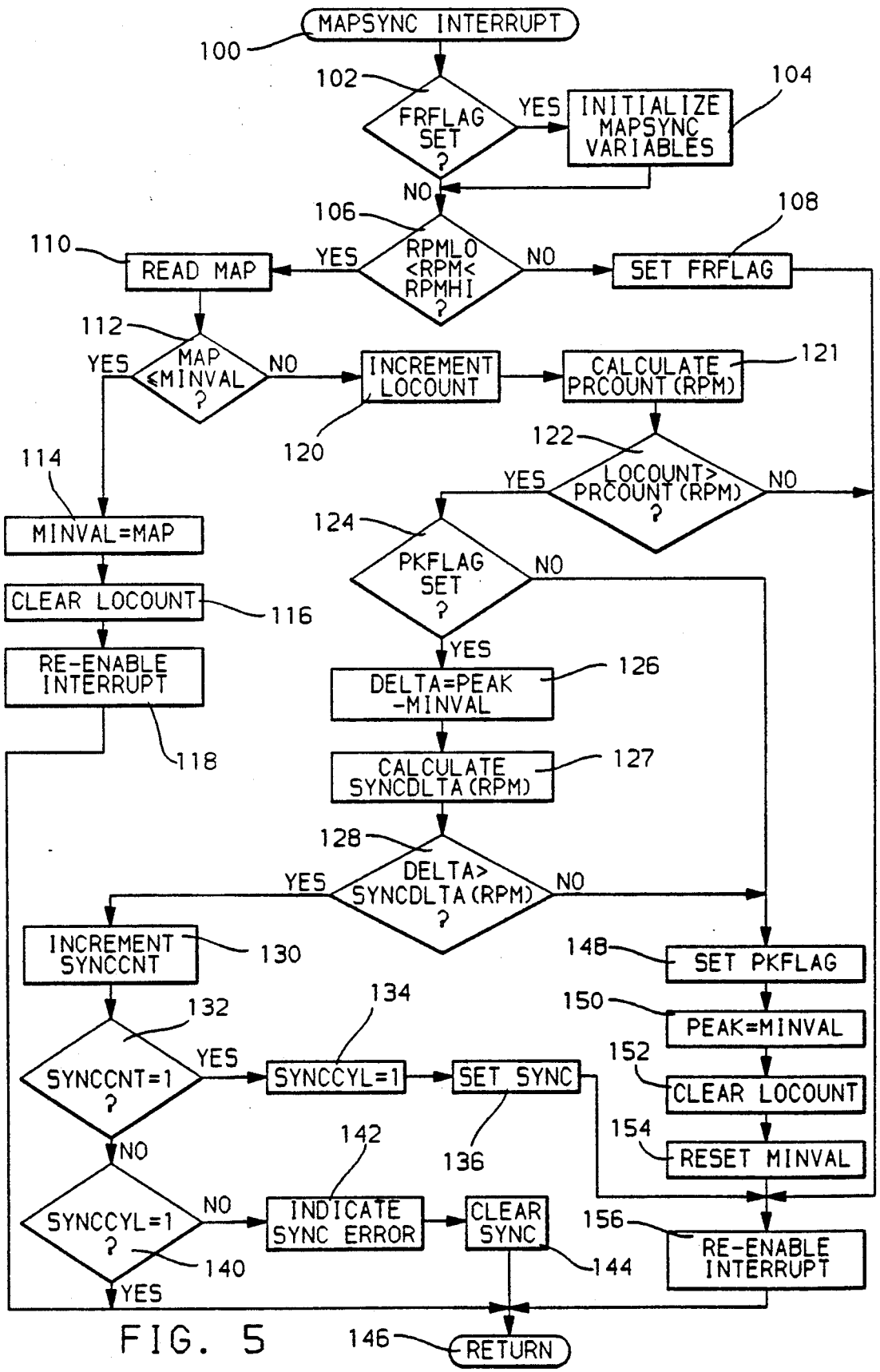
Figure 6B:
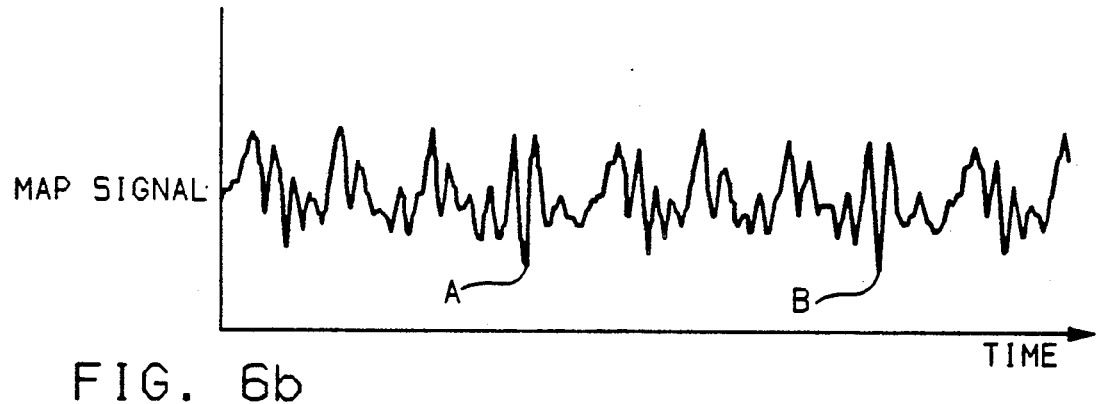

The routine to read and interpret the MAP sensor 20 (FIG. 1) for synchronization is illustrated in FIG. 5 and is entered at step 100. Generally, this routine analyzes the manifold absolute pressure MAP signal, such as that illustrated in FIG. 6b for a minimum value over each engine cycle. Point A in FIG. 6b indicates such a minimum for a first engine cycle and point B in FIG. 6b for a second engine cycle. Once a qualifying minimum is found, a cylinder position counter is synchronized so that it points to the cylinder likely to be responsible for the minimum MAP value.

Figure 6C:
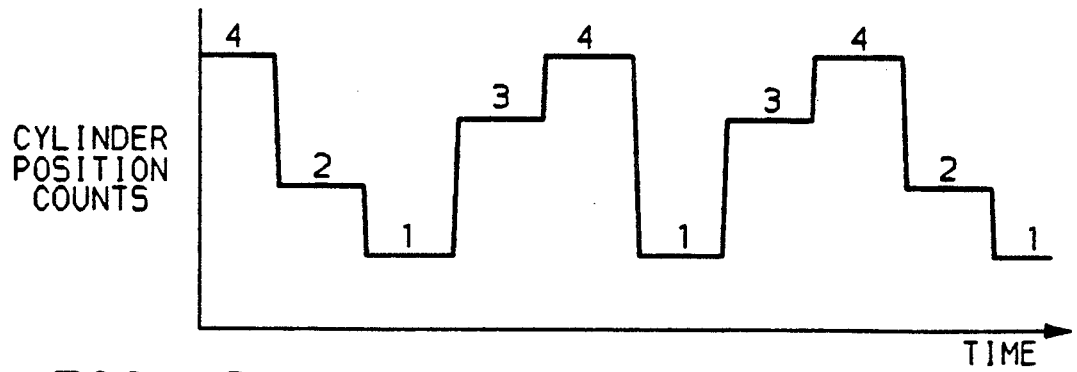

In this embodiment, the MAP sensor is positioned so that the intake event of only one cylinder will be responsible for a qualifying minimum MAP value—cylinder four. Cylinder four was selected in this embodiment for packaging and calibration simplicity. FIG. 6c shows generally the synchronization process wherein a cylinder counter SYNCCYL moves through values indicating the next active cylinder, which is the cylinder undergoing an intake event. In this embodiment, the intake event for a cylinder occurs after the crank event for that cylinder.

For example, looking at the minimum point A, the MAP synchronization routine of this embodiment (illustrated in FIG. 5) can identify A as indicative of the intake event of cylinder four shortly after point A passes. At that time, the next crankshaft reference pulse (or crank event) has already passed, so the counter should be set to the cylinder not one but two ahead of cylinder four in the firing order. In this embodiment, in which the firing order of the four cylinder engine is 1-3-4-2, SYNCCYL is set to one when the intake event of cylinder four is detected. Thereafter SYNCCYL may continue counting through the firing order repeatedly while the engine is operating, providing information to the controller for conventional engine control purposes.

Once the routine of FIG. 5 is enabled at step 84 of the routine of FIG. 4, it will be executed at a substantially fixed frequency. In this embodiment, this frequency is set at 0.5 milliseconds, such that approximately every 0.5 milliseconds the routine will be repeated. A snapshot of MAP is taken for analysis on each execution of the routine. In accord with the principles of this invention, the routine must read MAP often enough to see at least one MAP value during each engine intake event. Over the range of engine speeds in which FIG. 5 will be active, it has been determined that an iteration rate of approximately 0.5 milliseconds is sufficient.

Specifically, once the routine of FIG. 5 is entered at step 100, the routine moves to step 102, to determine if the present execution of the routine is a first execution, which is indicated by flag FRFLAG being set. IF FRFLAG is set, some RAM variable initialization is necessary, and the routine moves to step 104 to initialize variables needed by the routine of FIG. 5. Specifically, at step 104, FRFLAG is cleared, MINVAL which is an eight-bit value stored in RAM 28 is set to 255, its maximum value, PEAK is cleared, DELTA is cleared, and LOCOUNT is cleared.

Next, or if FRFLAG was not set at step 102, the routine moves to step 106 to determine whether engine speed is within a range which has been found to provide detectable intake events via the MAP sensor 20. In this embodiment, a range of 1400 r.p.m. to 2500 r.p.m. was experimentally found to yield detectable MAP changes during engine intake events. Accordingly at step 106, two ROM 26 constants RPMLO and RPMHI, which are respectively set to 1400 r.p.m. and 2500 r.p.m., are compared to present engine speed RPM. If RPM is between RPMLO and RPMHI at step 106, MAP synchronization may proceed.

However, if RPM is outside the range, the routine advances to step 108 to set FRFLAG, indicating that an RPM excursion interrupted any MAP synchronization that may have been in progress, and any old MAP synchronization data must be reset before any further MAP synchronization will be attempted. The routine then moves to step 156 to re-enable the interrupt that invokes the routine of FIG. 5 to occur approximately 0.5 milliseconds after the previous of such interrupts. The routine then returns to any prior routine that may have been executing at the time of the present interrupt.

Returning to step 106, if RPM is within the prescribed range, the routine moves to step 110, to read manifold absolute pressure MAP, which may be received from the MAP sensor 20 (FIG. 1) through a conventional analog to digital converter and through any conventional filtering that removes high frequency noise components from the signal and yet does not introduce a detrimental amount of lag in the signal. Such a balance between noise rejection and lag is generally understood in the art of engine control and conventional practice is intended by the inventors to provide an appropriate "clean" signal to the controller 22.

After reading the filtered MAP at step 110, the routine moves to step 112 to compare MAP to MINVAL, a RAM based variable that stores the minimum MAP value sensed since MINVAL was last reset. If MAP is less than or equal to MINVAL, a new minimum MAP has been found which may indicate an intake event. Accordingly, the routine advances to step 114, to store MAP as the new MINVAL, and then moves to step 116, to clear LOCOUNT, a count stored in RAM 28 (FIG. 1) of the number of sensed MAP values that was greater in magnitude than the most recent stored MINVAL. Next, the routine re-enables the interrupt used to invoke the routine of FIG. 5, and then returns to any prior routine via step 146, as discussed.

Returning to step 112, if MAP is not less than or equal to the previously stored MINVAL, the routine moves to step 120, to increment LOCOUNT to indicate that a MAP value exceeded MINVAL. Next, the routine moves to step 121 to determine an appropriate value for PRCOUNT(RPM) a count threshold value inversely proportional to engine speed RPM. PRCOUNT(RPM) is used to determine the magnitude of a MAP depression and to categorize any depression as one that may be from an intake event. It is calibrated for the four cylinder engine of this embodiment based on such factors as the size of the engine intake manifold (not shown), the volume of the engine cylinders, and the proximity of the MAP sensor 20 in the manifold to the intake runners, especially the runner for cylinder number four.

For instance, air pressure in an intake manifold will react more quickly to the opening of intake valves if the intake manifold is relatively small, and will decrease more substantially for larger cylinder volumes. Furthermore, if the MAP sensor 20 is located relatively close to the cylinder intake runners, the manifold pressure depression will appear more quickly, and likely more substantially for a given intake valve opening. Additionally engine speed can affect the size of the depression wherein the size of the depression has been found to be inversely proportional to the magnitude of engine speed. Accordingly, PRCOUNT(RPM) has been calibrated with consideration to the foregoing factors and is stored in ROM 26 (FIG. 1) as inversely proportional to engine speed (the only of the above factors not constant) as follows

PRCOUNT(RPM) = 30 − (((RPM-1400))/1100)*20 which is a linear model of the relationship between RPM and PRCOUNT() having two boundary conditions: PRCOUNT(1400) = 30 and PRCOUNT(2500) = 10. Note that the test range has already been limited to the range 1400 r.p.m. to 2500 r.p.m.

After calculating PRCOUNT() at step 121, the routine proceeds to step 122 to compare LOCOUNT to PRCOUNT(RPM) in order to determine if MINVAL may be classified as a MAP peak which, in this embodiment, means that MINVAL is at some low pressure that potentially may indicate an intake event. Such a classification will only be made in this embodiment if MAP exceeds MINVAL for a number PRCOUNT(RPM) of MAP readings, indicating that MINVAL is a significant signal valley. If LOCOUNT does not exceed PRCOUNT() at step 122, the routine resets the interrupt at step 156 and returns to any previously executing routine via step 146, as described.

Alternatively at step 122, if LOCOUNT exceeds PRCOUNT(), it is assumed that MINVAL is a signal peak, and further analysis of the peak is provided at steps 124-144. Specifically, the routine proceeds to step 124, to determine if a prior peak has been stored or if the present MINVAL is the first potential peak in the test period. A prior stored peak is indicated by a RAM based flag PKFLAG being set.

If PKFLAG is not set at step 124, the routine moves to steps 148-154 to properly record the first peak. First, the routine moves to step 148, to set PKFLAG. Next, the routine advances to step 150 to store MINVAL as the new peak PEAK. The routine then proceeds to step 152, to clear LOCOUNT so it may be used to detect a subsequent peak. Finally, the routine advances to step 154, to reset MINVAL to its maximum value 255, in preparation for the next low MAP value to be stored. After step 154, the interrupt is re-enabled at step 156 and the routine exits via step 146, as discussed.

Returning to step 124, if PKFLAG is set, indicating that a prior peak has been identified, the routine moves to steps 126-128 to determine if the present peak may be attributed to the intake event of cylinder four. Specifically, the routine first calculates DELTA at step 126. DELTA is the difference between the previously stored peak PEAK and the presently identified peak MINVAL.

Next, the routine moves to step 127 to determine SYNCDLTA(RPM) which is a value directly proportional to engine speed RPM representing the relative pressure drop in the manifold between the engine cylinder intake events. In other words, for a given engine, with the MAP sensor 20 strategically located in the engine intake manifold (not shown), although a peak pressure drop is expected for the intake event of each of the four cylinders, the pressure drop for the cylinder whose intake runner is closest to the MAP sensor 20, cylinder four in this embodiment, will be substantially greater and specifically, the drop will be an amount SYNCDLTA() greater than the other peak values.

SYNCDLTA should be calibrated with consideration to sensed peak drops in manifold pressure during each cylinder intake event, and the relative magnitude of these drops. For example, if, for the intake event of the cylinder whose intake runner is closest to the MAP sensor 20, the MAP sensor consistently drops five counts or more below its peak drop for the intake events of the other cylinders, for a given engine speed X, SYNCDLTA(X) should be set to five. In this embodiment, SYNCDLTA(RPM) is determined as follows $$SYNCDLTA(RPM) = 3 + (((RM-1400)/1100)*7).$$

In a well-known manner, this represents a linear relationship of direct proportionality between engine speed and SYNCDLTA(), subject to two boundary conditions: SYNCDLTA(1400)=3, and SYNCDLTA(2500)=10.

After calculating SYNCDLTA(RPM)) at step 127, the routine moves to step 128 to compare SYNCDLTA(RPM) to DELTA. If DELTA exceeds SYNCDLTA(RPM), the most recent sensed peak MINVAL is so low relative to a previously measured peak that it may be assumed to only have resulted from an intake event from cylinder four (the cylinder in this embodiment having an intake runner closest to the MAP sensor). In such a case, the routine moves to synchronize the crankshaft reference signal (FIG. 6a) to a position in the overall engine cycle, via steps 132-136.

Alternatively at step 128, if SYNCDLTA(RPM) is not less than DELTA, the intake event of cylinder four has not yet been identified, and the routine moves to prepare for the next peak, via steps 148-156, as described, and then returns to the prior routine via step 146.

Returning to the synchronization steps 130-136, step 130 is first executed to increment SYNCCNT, a counter stored in RAM 28 (FIG. 1) indicating the number of times the routine of FIG. 5 has identified the intake event of cylinder four. Next, the routine proceeds to step 132, where SYNCCNT is compared to one. If SYNCCNT equals one at step 132, the present iteration of the routine of FIG. 5 is the first to have identified the intake event of cylinder four, and the routine moves to step 134, to set SYNCCYL to one. The assignment of one to SYNCCYL synchronizes the crankshaft reference signal, indicating that the next crank event will point to cylinder one.

The firing order of the engine in this embodiment is 1-3-4-2. The routine of FIG. 5 identified the intake event of cylinder four. Although one may expect that the next cylinder event would be from cylinder two, the amount of time taken to identify the intake event of cylinder four has caused the event from cylinder two to be missed. Accordingly, the next cylinder in the firing order, cylinder one, is pointed to by setting SYNCCYL to one. The value assigned to SYNCCYL thus is a function of the amount of time needed for the routine of FIG. 5 to recognize the appropriate intake event, and the engine speed. The delay is illustrated in FIG. 6c where for example, after identifying the minimum MAP at point A, the cylinder counter SYNCCYL is set to one, as the crank event that should correspond to cylinder two (shown in FIG. 6a) passed before the diagnosis was made.

SYNCCYL may be used by conventional fueling routines to administer fuel to the appropriate cylinder during its intake event. For instance, in FIG. 4 at step 72, sequential fuel injection is enabled, allowing, after an appropriate delay, fuel to be administered to cylinder #SYNCCYL. After each execution of step 72, the function NEXTCYL() is used to move to the appropriate next cylinder. In other words, once the crank event service routine of FIG. 4 is instructed as to an appropriate SYNCCYL value, it can continue to update SYNCCYL for each subsequent crank event.

Returning to FIG. 5, after setting SYNCCYL to one at step 134, the routine moves to step 136, to set RAM flag SYNC, indicating that synchronization has taken place. The routine then resets the interrupt at step 156, and returns to any prior routine via step 146, as discussed. Returning to step 132, if SYNCCNT is not equal to one, indicating that at least one prior synchronizing intake event has been detected by the routine of FIG. 5, the routine moves to step 140, to verify that the crankshaft sensor is in 'sync,' by verifying that it has, since it was last set to one at step 134, presumably one full engine cycle ago, moved back to that same value of one, via the mapping procedure at step 74 of FIG. 4.

If it is at one at step 140, the routine of FIG. 5 has verified its prior synchronization, and further verification is deemed unnecessary in this embodiment. Accordingly, the interrupt used to invoke the routine of FIG. 5 is not re-enabled, by passing directly from step 140 to step 146. The inventors intend that this routine, in an alternative embodiment within the scope of this invention, may continue to verify the synchronization of the sensor by resetting the MAP sync interrupt that invokes the routine of FIG. 5 if SYNCCYL equals one at step 140, such as by proceeding from step 140 to step 156 and then to step 146.

Returning to step 140, if SYNCCYL is not equal to one, a synchronization error has occurred, and the routine proceeds to step 142 to flag the error, such as by setting an appropriate flag in non-volatile RAM (not shown). The routine then moves to step 144, to clear SYNC, the flag used to indicate that the crankshaft is properly synchronized. The routine then moves directly to step 146 to return to any prior executing routine without re-enabling the interrupt that invokes the routine of FIG. 5, as it is assumed in this embodiment that such routine is not operating reliably.

The foregoing description of a preferred embodiment for the purpose of illustrating the principles of the invention is not to be taken as limiting or restricting the invention since many modifications may be made through the exercise of skill in the art without departing from the scope of the invention.

The embodiments of the invention in which a privilege or property is claimed are defined as follows:

1. A method for sensing an intake stroke of a predetermined cylinder in an internal combustion engine having a plurality of cylinders and having an air intake manifold, comprising the steps of:
   sensing air pressure at a predetermined location in the air intake manifold in proximity to an air intake path to the predetermined cylinder;
   generating a signal representative of the sensed air pressure; and
   sensing the intake stroke of the predetermined cylinder when the signal is at a minimum value.

2. The method of claim 1, further comprising the step of:

periodically measuring the magnitude of the generated signal during an engine cycle, and wherein the intake stroke sensing step senses the intake stroke of the predetermined cylinder when the lowest pressure signal is measured.

3. The method of claim 1, further comprising the steps of:
sensing engine speed; and
comparing engine speed to a predetermined engine speed range, and wherein the intake stroke sensing step senses the intake stroke of the predetermined cylinder when the engine speed is within the predetermined engine speed range and the pressure signal is at a minimum value.

4. The method of claim 1, further comprising the step of:
measuring the magnitude of the generated signal during the intake strokes of a multiplicity of the engine cylinders including the predetermined cylinder, and wherein the intake stroke sensing step senses the intake stroke of the predetermined cylinder when a minimum magnitude is measured.

5. A method for determining when an engine having an intake manifold is at a predetermined operating angle within an engine cycle, comprising the steps of:
sensing air pressure in the intake manifold at a predetermined position in proximity to an air intake of a predetermined cylinder;
determining when the sensed air pressure is at a minimum pressure over the engine cycle; and
determining the engine to be at the predetermined operating angle when the sensed air pressure is at the minimum pressure.

6. An apparatus for sensing an intake stroke of a predetermined cylinder in an internal combustion engine having a plurality of cylinders and having an air intake manifold, comprising:
a pressure sensor for sensing air pressure in the engine intake manifold at a predetermined position in proximity to an intake air path to the predetermined cylinder;
signal generating means for generating a signal representative of the sensed air pressure; and
means for sensing the intake stroke of the predetermined cylinder when the pressure signal is at a minimum value.

7. The apparatus of claim 6, further comprising:
means for periodically measuring the magnitude of the generated signal over an engine cycle, and wherein the intake stroke sensing means senses the intake stroke of the predetermined cylinder when a minimum magnitude is measured.

8. The apparatus of claim 6, further comprising:
means for sensing engine speed; and
means for comparing engine speed to a predetermined engine speed range, and wherein the intake stroke sensing means includes means for sensing the intake stroke of the predetermined cylinder when the engine speed is within the predetermined range and the pressure signal is at a minimum value.

9. The apparatus of claim 6, further comprising:
means for measuring the magnitude of the generated signal during the air intake event of a multiplicity of engine cylinders including the predetermined cylinder, and wherein the intake stroke sensing means includes means for sensing the intake stroke of the predetermined cylinder when a minimum magnitude is measured.

* * * * *